United States Patent
Shin et al.

(10) Patent No.: US 9,722,759 B2
(45) Date of Patent: Aug. 1, 2017

(54) RADIO TRANSCEIVER FOR VIRTUAL FULL DUPLEX COMMUNICATION USING UNUSED RESOURCES

(71) Applicant: SAMSUNG ELECTRONICS CO., LTD., Suwon-si (KR)

(72) Inventors: Won-Jae Shin, Seoul (KR); Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 14/153,306

(22) Filed: Jan. 13, 2014

(65) Prior Publication Data

US 2015/0036555 A1    Feb. 5, 2015

(30) Foreign Application Priority Data

Aug. 1, 2013  (KR) .................. 10-2013-0091670

(51) Int. Cl.
| | | |
|---|---|---|
| *H04L 5/00* | (2006.01) | |
| *H04B 7/155* | (2006.01) | |
| *H04W 72/04* | (2009.01) | |
| *H04W 84/04* | (2009.01) | |

(52) U.S. Cl.
CPC .......... *H04L 5/0069* (2013.01); *H04B 7/155* (2013.01); *H04B 7/15564* (2013.01); *H04W 72/0406* (2013.01); *H04W 84/047* (2013.01)

(58) Field of Classification Search
None
See application file for complete search history.

(56) References Cited

U.S. PATENT DOCUMENTS

| | | | | |
|---|---|---|---|---|
| 2009/0059819 A1* | 3/2009 | Choi | ................. | H04B 7/15542 370/280 |
| 2009/0268662 A1* | 10/2009 | Larsson | ................. | H03M 7/30 370/328 |
| 2010/0201398 A1* | 8/2010 | Zhao | ..................... | H04L 1/0041 326/52 |
| 2011/0013552 A1* | 1/2011 | Ali | ..................... | H04B 7/15521 370/315 |
| 2011/0195704 A1 | 8/2011 | Choi et al. | | |
| 2011/0268064 A1 | 11/2011 | Chen et al. | | |
| 2012/0106405 A1 | 5/2012 | Lioliou et al. | | |

(Continued)

FOREIGN PATENT DOCUMENTS

| | | |
|---|---|---|
| KR | 10-2005-0046380 A | 5/2005 |
| KR | 10-2007-0056311 A | 6/2007 |
| KR | 10-2008-0016459 A | 2/2008 |

(Continued)

OTHER PUBLICATIONS

International Search Report mailed on May 21, 2014 in counterpart International Patent Application No. PCT/KR2014/000501 (4 Pages in English).

*Primary Examiner* — Awet Haile
(74) *Attorney, Agent, or Firm* — NSIP Law

(57) ABSTRACT

A radio transceiver and corresponding method include a transmission unit configured to transmit an uplink signal to a base station. A receiving unit is configured to receive a relay signal, which comprises the uplink signal and a downlink signal received from the base station. An extraction unit is configured to extract the downlink signal from the relay signal based on the uplink signal.

28 Claims, 6 Drawing Sheets

(56) References Cited

U.S. PATENT DOCUMENTS

2012/0127916 A1    5/2012  Yoo et al.
2013/0273834 A1\*  10/2013  Sundstrom ............ H04B 7/155
                                                                          455/7

FOREIGN PATENT DOCUMENTS

| KR | 10-2009-0010582 A | 1/2009 |
| --- | --- | --- |
| KR | 10-2010-0120820 A | 11/2010 |
| KR | 10-2011-0092433 A | 8/2011 |
| KR | 10-2012-0054469 A | 5/2012 |
| KR | 10-2012-0095577 A | 8/2012 |
| KR | 10-2013-0016350 A | 2/2013 |

\* cited by examiner

RADIO TRANSCEIVER FOR VIRTUAL FULL DUPLEX COMMUNICATION USING UNUSED RESOURCES

CROSS-REFERENCE TO RELATED APPLICATION(S)

This application claims the benefit under 35 USC §119(a) of Korean Patent Application No. 10-2013-0091670, filed on Aug. 1, 2013, in the Korean Intellectual Property Office, the entire disclosure of which is incorporated herein by reference for all purposes.

BACKGROUND

1. Field

The following description relates to a radio communication apparatus and method, and more particularly, to a radio transceiver and corresponding method performing radio communication bidirectionally.

2. Description of Related Art

A radio transceiver is a communication device including both a transmitter and a receiver. In the radio transceiver, the transmitter may be proximity-coupled to the receiver. The proximity-coupled transmitter transmits a strong transmission signal that may interfere with a receiving operation of the receiver. Such a phenomenon that operation of a device is interfered by a signal transmitted by the device itself is called self interference.

In general, a radio transceiver divides frequency resources or time resources and allocates different resources to the transmitter and the receiver to prevent the self interference.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a radio transceiver, including a transmission unit configured to transmit an uplink signal to a base station; a receiving unit configured to receive a relay signal, which includes the uplink signal and a downlink signal received from the base station; and an extraction unit configured to extract the downlink signal from the relay signal based on the uplink signal.

The receiving unit may be further configured to receive the relay signal from a proximity device through a short range wireless communication network set with respect to the proximity device. Resources to transmit the uplink signal from the transmission unit may be same as resources to transmit the downlink signal from the base station.

The transmission unit may transmit the uplink signal to the base station through a first communication scheme using first resources, and the receiving unit may receive the relay signal from a proximity device through a second communication scheme using second resources, wherein the second communication scheme uses a lower transmission power than a transmission power used by the first communication scheme.

A sharing unit may be configured to share information on resources allocated by the base station. The transmission unit may transmit the uplink signal using the resources, and the relay signal may be based on an overlapped signal of the uplink signal and the downlink signal using the resources.

A sharing unit may be configured to share information with a proximity device. The base station may inform the proximity device of information allocated by the base station.

The base station may support full duplex communication.

In accordance with an illustrative configuration, there is provided a radio transceiver, including a determination unit configured to determine resources to communicate with a second radio transceiver; a transmission unit configured to transmit a first signal using the resources; a receiving unit configured to receive a relay signal including the first signal and a second signal; and an extraction unit configured to extract the second signal from the relay signal based on the first signal.

The relay signal may be based on an overlapped signal of the second signal from the second radio transceiver and the first signal from the transmission unit.

The receiving unit may receive the second signal from the second radio transceiver through a proximity device.

The second radio transceiver may transmit the second signal using same resources as the resources determined at the determination unit.

The receiving unit may receive the relay signal from the proximity device using a second communication scheme which is different from a first communication scheme used by the transmission unit, and the second communication scheme may use lower transmission power than transmission power used by the first communication scheme.

A sharing unit may be configured to share information about the resources. The relay signal may be based on an overlapped signal of the first signal and the second signal using the resources.

An acquirement unit may be configured to acquire information from a second proximity device linked to the second radio transceiver; and a sharing unit may be configured to share information about the resources with the second proximity device.

The second proximity device, linked to the second radio transceiver, may relay an overlapped signal of the second signal transmitted from the second radio transceiver and the first signal transmitted from the transmission unit to the second radio transceiver.

In accordance with an illustrative configuration, there is provided a relay device including a receiving unit configured to receive an overlapped signal of a first signal transmitted from a first node and a second signal transmitted from a second node; a generation unit configured to generate a relay signal based on the overlapped signal; and a transmission unit configured to transmit the relay signal to the first node.

An acquirement unit may be configured to acquire information on resources to receive a radio signal, wherein the receiving unit receives the overlapped signals using the resources.

The second signal may be a signal extracted from the relay signal based on the first signal.

The receiving unit may receive the first signal from the first node based on a first communication scheme using the resources, the receiving unit may receive the second signal from the second node based on the first communication scheme, the transmission unit may transmit the relay signal using a second communication scheme that uses different resources from the resources, and the second communication scheme may use lower transmission power than transmission power used by the first communication scheme.

The acquirement unit may acquire information of the resources from the second node when the second node is aware of a presence of the relay device, and may acquire the information of the resources from the first node when the second node is unaware of presence of the relay device.

In accordance with an illustrative configuration, there is provided a method of a radio transceiver, including transmitting an uplink signal to a base station; receiving a relay signal, which includes the uplink signal and a downlink signal received from the base station; and extracting the downlink signal from the relay signal by canceling the uplink signal from the relay signal.

The method may include configuring the relay signal to be a sum of the uplink signal times a state of a channel between the base station and a proximity device, and the downlink signal and a state of a channel between the proximity device and the radio transceiver.

The method may also include receiving the relay signal from a proximity device through a short range wireless communication network set with respect to the proximity device.

The method may further include configuring resources to transmit the uplink signal from the transmission unit to be same as resources to transmit the downlink signal from the base station.

The method may further include transmitting the uplink signal to the base station through a first communication scheme using first resources; and receiving the relay signal from a proximity device through a second communication scheme using second resources, wherein the second communication scheme uses a lower transmission power than a transmission power used by the first communication scheme.

The method may further include sharing information on resources allocated by the base station; and transmitting the uplink signal using the resources, wherein the relay signal is based on an overlapped signal of the uplink signal and the downlink signal using the resources.

The method may further include sharing information with a proximity device, wherein the base station informs the proximity device of information allocated by the base station.

In accordance with an illustrative configuration, there is provided a non-transitory computer readable medium configured to control a processor to perform the method described above.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
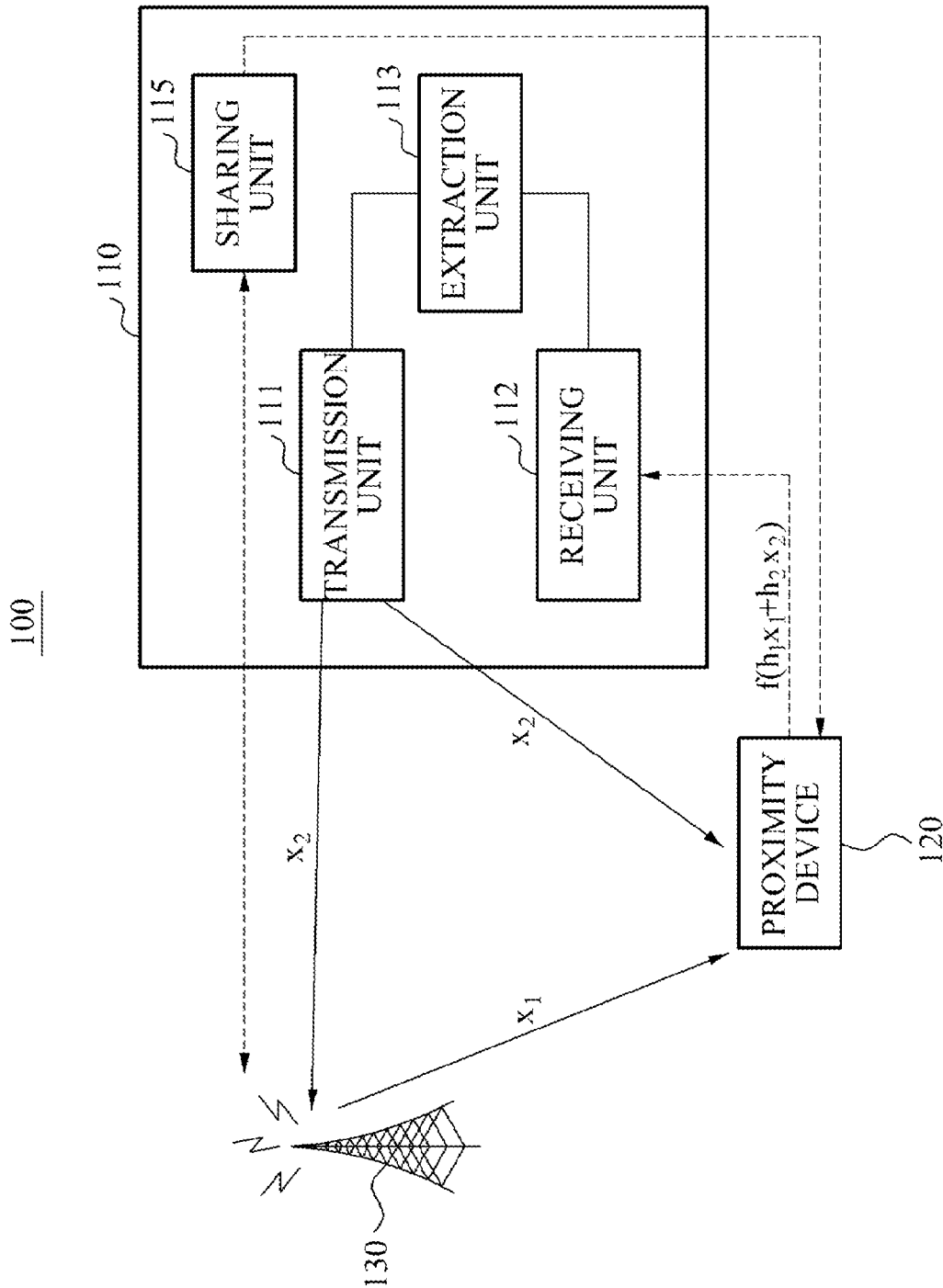
FIG. 1 is a block diagram illustrating an example of a radio transceiver communicating with a base station using a virtual full duplex method, in accord with an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a radio transceiver communicating with a base station using a virtual full duplex method, in accord with an embodiment.

Referring to FIG. 1, a communication system 100 applying the virtual full duplex networking scheme or method includes a radio transceiver 110, a proximity device 120, and a base station 130.

The radio transceiver 110 transmits an uplink signal $x_2$. The base station 130 transmits a downlink signal $x_1$ and supports a full duplex communication.

For example, the base station 130 transmits the downlink signal $x_1$ using particular communication resources, and receives the uplink signal $x_2$ using same communication resources. In one example, the communication resources include same frequency and same time. The base station 130 uses an echo cancellation scheme for the full duplex communication.

The radio transceiver 110 supports the virtual full duplex communication during operation with the proximity device 120. In one illustrative example, the proximity device 120 is a relay device that uses unused resources, including a laptop computer, a desktop computer, a tablet computer, a smart phone, a personal digital assistant (PDA), a nano relay, a terminal, a device to device (D2D), and other similar devices. The proximity device 120 performs relay operation for the radio transceiver 110 and, in one configuration, is located adjacent to the radio transceiver 110.

For example, the radio transceiver 110 transmits the uplink signal $x_2$, using the communication resources, simultaneously or thereafter, the proximity device 120 receives the downlink signal $x_1$ using the same communication resources.

The proximity device 120 receives the downlink signal $x_1$ and the uplink signal $x_2$ transmitted from the radio transceiver 110 because the communication resources used at the radio transceiver 110 to transmit the uplink signal $x_2$ are same as the communication resources used at the base station 130 to transmit the downlink signal $x_1$.

The proximity device 120 transmits a relay signal including both the downlink signal $x_1$ and the uplink signal $x_2$ to the radio transceiver 110. In one illustrative example, the proximity device 120 uses different communication resources from the communication resources used to transmit the downlink signal $x_1$ and the uplink signal $x_2$ to transmit the relay signal to the radio transceiver 110. According to an aspect, the proximity device 120 transmits the relay signal to the radio transceiver 110 through a short range wireless communication network such as wireless fidelity (Wi-Fi), Bluetooth, Zigbee, wireless personal area network (WPAN), and other similar communication networks.

The radio transceiver 110 extracts the downlink signal $x_1$ from the relay signal. In one configuration, because the radio transceiver 110 is already aware of the uplink signal $x_2$, the radio transceiver 110 cancels the uplink signal $x_2$ included in the relay signal to obtain the downlink signal $x_1$.

Being coupled to the proximity device 120 through the foregoing communication scheme, the radio transceiver 110 supports multi hop based full duplex communication.

In detail, the radio transceiver 110 includes a transmission unit 111, a receiving unit 112, and an extraction unit 113.

The transmission unit 111 transmits the uplink signal $x_2$ to the base station 130, and the receiving unit 112 receives the relay signal including the uplink signal $x_2$ and the downlink signal $x_1$. The extraction unit 113 extracts the downlink signal $x_1$ from the relay signal based on the uplink signal $x_2$.

The proximity device 120 receives an overlapped signal of the downlink signal $x_1$ transmitted from the base station 130 and the uplink signal $x_2$ transmitted from the transmission unit 111. The proximity device 120 generates the relay signal based on the overlapped signal.

The relay signal may be expressed as $f(h_1x_1+h_2x_2)$ which is a combination or a function of the downlink signal $x_1$ and the uplink signal $x_2$. In one example, $h_1$ refers to a state of a channel between the base station 130 and the proximity device 120 and $h_2$ refers to a state of a channel between the proximity device 120 and the radio transceiver 110. The state of the channel may include channel properties of a communication link. For example, the state of the channel may describe how a signal propagates from the transmitter to the receiver and represents the combined effect of scattering, fading, and power decal with distance. Thus, in one illustrative example, the relay signal is a sum of the uplink signal times a state of a channel between the base station 130 and a proximity device 120, and the downlink signal times a state of a channel between the proximity device 120 and the radio transceiver 110.

The proximity device 120 relays the relay signal using a different communication scheme or method from a communication scheme used at the radio transceiver 110 and the base station 130 to transmit the downlink signal $x_1$ and the uplink signal $x_2$. For example, the proximity device 120 transmits the relay signal to the radio transceiver 110 using a communication scheme with weaker transmission power than the transmission power used by the communication scheme to transmit the downlink signal $x_1$ and the uplink signal $x_2$. The proximity device 120 supports a first communication scheme to receive the downlink signal $x_1$ and the uplink signal $x_2$ and a second communication scheme to transmit the relay signal.

The radio transceiver 110 may further include a sharing unit 115. The sharing unit 115 shares information on resources allocated to the base station 130 with the proximity device 120. In this case, the proximity device 120 recognizes resources to receive radio signals based on the shared information.

According to another embodiment, the sharing unit 115 shares information of the proximity device 120 with the base station 130. In this case, the base station 130 may recognize the proximity device 120 based on the shared information. Through the sharing unit 115, the base station 130 informs the proximity device 120 of information on resources allocated for communication with the radio transceiver 110.

Figure 2:
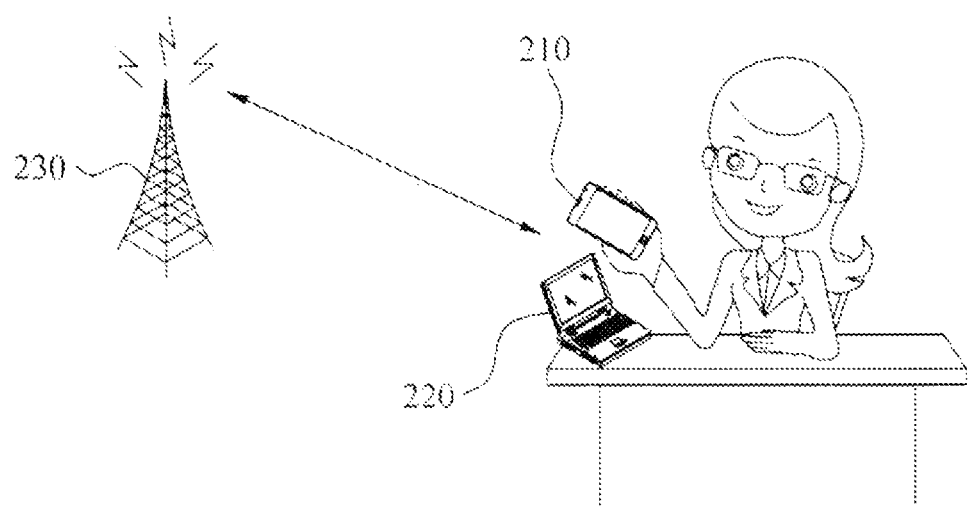
FIG. 2 is a diagram illustrating an example of a system communicating with a base station using the virtual full duplex method, in accord with an embodiment.

FIG. 2 illustrates an example of a system communicating with a base station using a virtual full duplex networking scheme or method, in accord with an embodiment.

Referring to FIG. 2, the virtual full-duplex communication networking scheme or method, according to an embodiment, may be applied to an infra structure system, such as a cellular system including a base station or a Wi-Fi system including an access point (AP).

In one example, a radio transceiver is a smart phone 210, a proximity device is a laptop computer, and the smart phone 210 communicates with a base station 230 in a cellular system.

The base station 230 supports full duplex communication. The smart phone 210 and the laptop computer 220 may support half duplex communication. The base station 230 transmits downlink traffic to the smart phone 210 and the smart phone 210 transmits uplink traffic to the base station 230.

To perform full duplex communication between the base station 230 and the smart phone 210, the base station 230 and the smart phone 210 simultaneously transmit the downlink traffic and the uplink traffic using a same frequency band.

Because the base station 230 supports the full duplex communication networking scheme or method, the base station 230 may receive the uplink traffic while transmitting the downlink traffic.

Because the smart phone 210 supports only the half duplex communication scheme, the smart phone 210 may perform virtual full duplex communication using the laptop computer 220, which is an unused device retained by a user. For example, when the base station 230 transmits the downlink signal to the smart phone 210, the laptop computer 220 receives the downlink signal on behalf of the smart phone 210. Simultaneously, the smart phone 210 transmits the uplink signal to the base station 230. In this case, the laptop computer 220 receives a signal in which the downlink signal transmitted from the base station 230 and the uplink signal transmitted from the smart phone 210 are combined. The laptop computer 220 transmits the combined signal to the smart phone 210 using third resources such as Wi-Fi, Bluetooth, Zigbee, WPAN, and other similar communication resources. Because the smart phone 210 is already aware of an uplink signal, the smart phone 210 is configured to decode the downlink signal by cancelling the uplink signal component from the received signal.

The laptop computer 220 may relay the received signal using various relay schemes or methods. For example, the laptop computer 220 may relay the received signal using an amplify-and-forward (AF) method, a quantize-and-forward (QF) method, a compute-and-forward (CF) method, and other similar schemes and methods. The laptop computer 220 may relay the received signal using a relay function, such as amplification and compression, which does not demand dedicated decoding.

The smart phone 210 transmits an uplink message and, at the same time, receives the relayed signal from the laptop computer 220 using third resources to support virtual full duplex communication.

Figure 3:
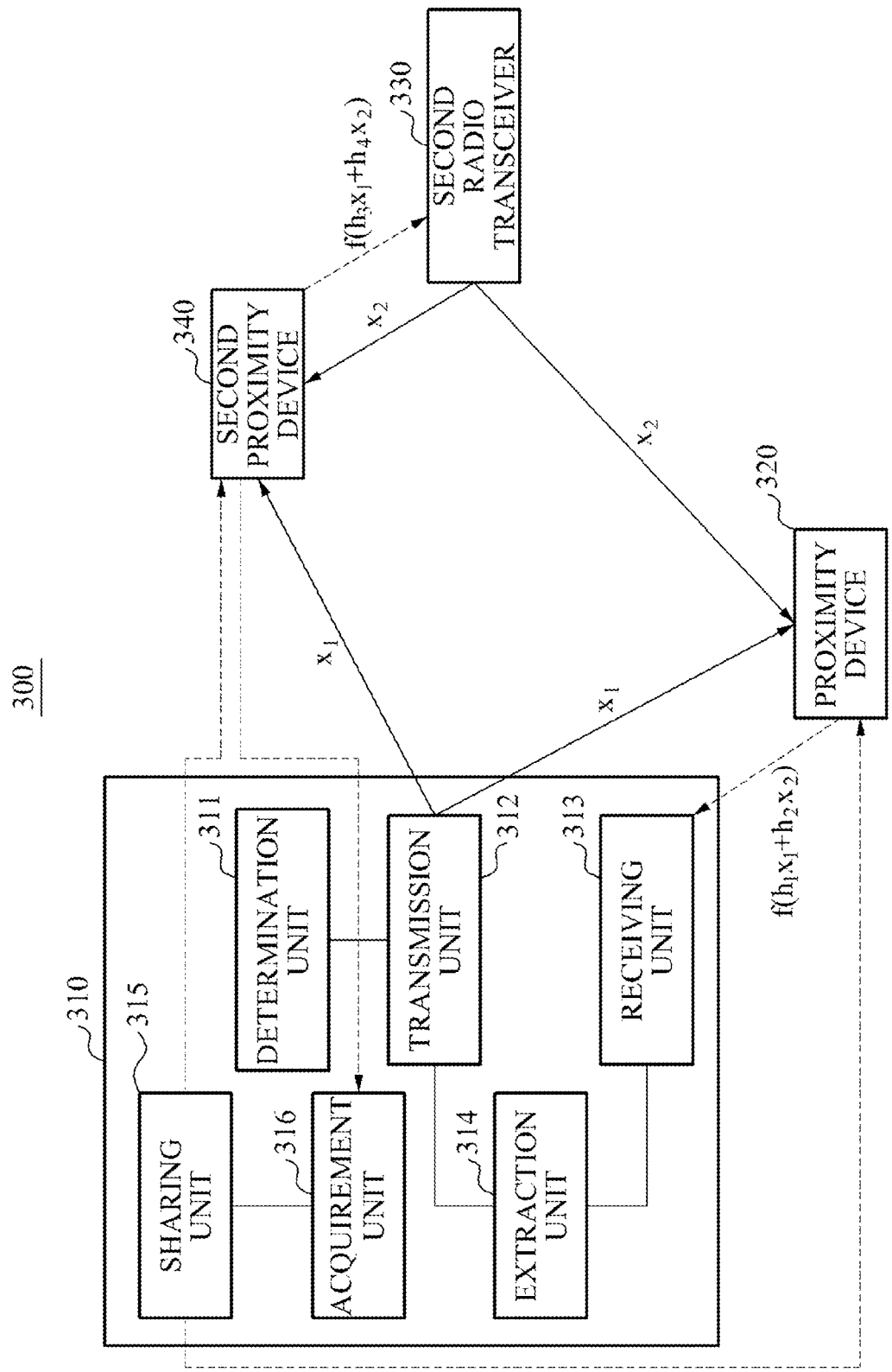
FIG. 3 is a block diagram illustrating an example of a radio transceiver communicating using the virtual full duplex method in a communications environment, in accord with an embodiment.

FIG. 3 illustrates an example of a radio transceiver communicating using a virtual full duplex networking scheme or method in a communications environment, in accord with an embodiment.

Referring to FIG. 3, a communication system 300 using the virtual full duplex networking scheme or method includes a radio transceiver 310, a proximity device 320, a second radio transceiver 330, and a second proximity device 340.

The radio transceiver 310 transmits a first signal $x_1$ and the second radio transceiver 330 transmits a second signal $x_2$. For example, the radio transceiver 310 transmits the first signal $x_1$ to the proximity device 320 and the second proximity device 340. In turn, the second radio transceiver 330 transmits the second signal $x_2$ to the proximity device 320 and the second proximity device 340.

The radio transceiver 310 supports the radio transceiver communication in association with the proximity device 320. For example, while the radio transceiver 310 is transmitting the first signal $x_1$ using particular resources, the proximity device 320 receives the second $x_2$ using the same particular resources.

The proximity device 320 receives the second signal $x_2$ transmitted from the second radio transceiver 330 and the first signal $x_1$ transmitted from the radio transceiver 310 because the resources used by the radio transceiver 310 to transmit the first signal $x_1$ are same as the resources used by the second radio transceiver 330 to transmit the second signal $x_2$.

The proximity device 320 transmits a relay signal including both the first signal $x_1$ and the second signal $x_2$ to the radio transceiver 310. In one example, the proximity device 320 transmits the relay signal to the radio transceiver 310 using different resources from resources used to transmit the first signal $x_1$ and the second signal $x_2$.

The radio transceiver 310 extracts the second signal $x_2$ from the relay signal. Because the radio transceiver 310 is already aware of the first signal $x_1$, the radio transceiver 310 cancels the first signal $x_1$ in the relay signal to obtain the second signal $x_2$.

Being coupled with the proximity device 320 through the foregoing scheme, the radio transceiver 310 supports multi-hop based full duplex communication.

In the same manner, the second radio transceiver 330 supports the radio transceiver communication by being coupled with the second proximity device 340. For example, while the second radio transceiver 330 is transmitting the second signal $x_2$ using particular resources, the second proximity device 340 receives the first signal $x_1$ using the same particular resources.

The second proximity device 340 receives the second signal $x_2$ and the first signal $x_1$ transmitted from the second radio transceiver 330 because the resources used by the second radio transceiver 330 to transmit the second signal $x_2$ are same as the resources used by the radio transceiver 310 to transmit the first signal $x_1$.

The second proximity device 340 transmits a relay signal including the first signal $x_1$ and the second signal $x_2$ to the second radio transceiver 330. In one example, the second proximity device 340 transmits the relay signal to the second radio transceiver 330 using different resources from the resources used to transmit the first signal $x_1$ and the second signal $x_2$.

The second radio transceiver 330 extracts the first signal $x_1$ from the relay signal. Because the second radio transceiver 330 is already aware of the second signal $x_2$, the second radio transceiver 330 cancels the second signal $x_2$ in the relay signal to obtain the first signal $x_1$.

Being coupled with the second proximity device 340 through the foregoing scheme, the second radio transceiver 330 supports multi hop based full duplex communication.

According to an embodiment, using the radio transceiver communication as illustrated in FIG. 3, a maximum throughput between the radio transceiver 310 and the second radio transceiver 330 is almost doubled.

As illustrated in FIG. 3, the radio transceiver 310 includes a determination unit 311, a transmission unit 312, a receiving unit 313, and an extraction unit 314.

The determination unit 311 determines communication resources to communicate with the second radio transceiver 330. For example, the determination unit 311 determines resources for data communication according to a procedure of starting ad hoc communication or D2D communication with the second radio transceiver 330, prior to performing data communication in the virtual full duplex communication scheme or method.

The transmission unit 312 transmits the first signal $x_1$ using the resources determined by the determination unit 311, and the receiving unit 313 receives the relay signal including the first signal $x_1$ and the second signal $x_2$ from the proximity device 320. The extraction unit 314 extracts the second signal $x_2$ from the relay signal based on the first signal $x_1$.

The proximity device 320 receives an overlapped signal of the second signal $x_2$ transmitted from the second radio transceiver 330 and the first signal $x_1$ transmitted from the transmission unit 312. The proximity device 320 generates the relay signal based on the overlapped signal.

The relay signal may be expressed as $f(h_1 x_1 + h_2 x_2)$, which is a combination or a function of the first signal $x_1$ and the second signal $x_2$. In one example, $h_1$ refers to a state of a channel between the proximity device 320 and the radio transceiver 310 and $h_2$ refers to a state of a channel between the radio transceiver 310 and the proximity device 320.

The proximity device 320 relays the relay signal using a different communication scheme from a communication scheme transmitting the first signal $x_1$ and the second signal $x_2$. For example, the proximity device 320 transmits the relay signal to the radio transceiver 310 using a communication scheme having weaker transmission power than the communication scheme to transmit the first signal $x_1$ and the second signal $x_2$. The proximity device 320 may support a first communication scheme to receive the first signal $x_1$ and the second signal $x_2$ and a second communication scheme to transmit the relay signal.

In one illustrative example, the radio transceiver 310 also includes a sharing unit 315. The sharing unit 315 shares information of the resources determined at the determination unit 311 with the proximity device 320 and the second proximity device 340. In this case, the proximity device 320 recognizes the communication resources to receive radio signals based on the shared information.

According to another embodiment, the radio transceiver 310 further includes an acquirement unit 316. The acquirement unit 316 acquires information of the second proximity device 340 linked to the second radio transceiver 330. In this case, the radio transceiver 310 recognizes the second proximity device 340 based on the acquired information. The sharing unit 315 informs the second proximity device 340 of the information on the resources determined at the determination unit 311.

Figure 4:
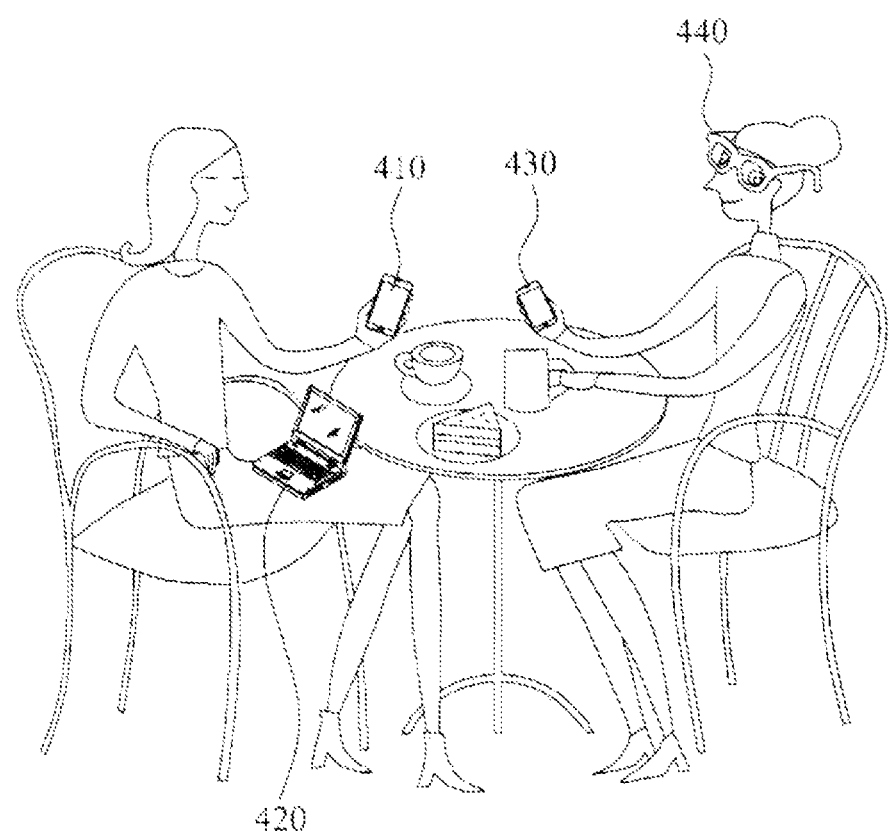
FIG. 4 is a diagram illustrating an example of a system communicating using the virtual full duplex method in the communications environment, in accord with an embodiment.

FIG. 4 illustrates an example of a system communicating using a virtual full duplex scheme in a communications environment, in accord with an embodiment.

Referring to FIG. 4, a virtual full duplex communication scheme, according to the embodiment, may be applied to a D2D communication system, an ad hoc communication system, or other general communication systems.

In one illustrative example, a radio transceiver is a first smart phone 410 of a first user, a proximity device is a laptop computer 420 of the first user, a second radio transceiver is a second smart phone 430 of a second user, and a second proximity device is smart glasses 440 of the second user.

In this example, the first smart phone 410 and the second smart phone 430 communicate with each other in a D2D communication environment. However, a person of ordinary skill in the relevant art will appreciate that the first smart phone 410 and the second smart phone 430 may communicate in other communication environments. The first smart phone 410 and the second smart phone 430 support half duplex communication.

The first smart phone 410 has a first traffic to transmit to the second smart phone 430 whereas the second smart phone 430 has a second traffic to transmit to the first smart phone 410.

For full duplex communication between the first smart phone 410 and the second smart phone 430, the first smart phone 410 and the second smart phone 430 transmit the first traffic and the second traffic, respectively, using same communication resources.

Because the first smart phone 410 supports only half duplex communication, the first smart phone 410 may perform virtual full duplex communication using the laptop computer 420, which is an unused device retained by the first user.

For example, when the second smart phone 430 transmits the second traffic to the first smart phone 410, the laptop computer 420 may receive the second traffic on behalf of the first smart phone 410. Simultaneously, the first smart phone 410 may transmit the first traffic to the second smart phone 430.

In this case, the laptop computer 420 receives a signal in which the second traffic transmitted from the second smart phone 430 and the first traffic transmitted from the first smart phone 410 are mixed.

The laptop computer 420 transmits the received signal to the first smart phone 410 using, for example, third resources such as Wi-Fi, Bluetooth, ZigBee, and WPAN.

The laptop computer 420 and the smart glasses 440 do not interfere with each other when transmitting the received signal, respectively. For example, when transmitting the received signal to the first smart phone 410, the laptop computer 420 may use low transmission power so as not to interfere with the smart glasses 440. Alternatively, the laptop computer 420 may share the third resources with the smart glasses 440.

The laptop computer 420 relays the received signal using various relay schemes or methods. For example, the laptop computer 420 uses the AF method, the QF method, or the CF method to relay the received signal. The laptop computer 420 relays the received signal using a relay function such as amplification and compression that does not demand dedicated decoding.

The first smart phone 410, already aware of the first signal, cancels a first signal component, which is a self interference, from the transmitted signal to decode the second signal.

The first smart phone 410 receives the relay signal from the laptop computer 420 using the third resources while transmitting a first message simultaneously, thus supporting the virtual full duplex communication.

Because the second smart phone 420 supports only half duplex communication, the virtual full duplex communication may be performed using the smart glasses 440, which is an unused device retained by the second user.

For example, when the first smart phone 410 transmits the first traffic to the second smart phone 430, the smart glasses 440 receives the first traffic on behalf of the second smart phone 430. Simultaneously, the second smart phone 430 transmits the second traffic to the first smart phone.

In this case, the smart glasses 440 receive a signal in which the first traffic transmitted from the first smart phone 410 and the second traffic transmitted from the second smart phone 430 are mixed.

The smart glasses 440 transmit the received signal to the second smart phone 430 using third resources such as Wi-Fi, Bluetooth, ZigBee, and WPAN.

The laptop computer 420 and the smart glasses 440 may not interfere with each other when transmitting the received signal, respectively. For example, when transmitting the received signal to the second smart phone 430, the smart glasses 440 use transmission power low enough not to interfere with the laptop computer 420, which is an unused device of the first user. Alternatively, the smart glasses 440 may share the third resources with the laptop computer 420.

The smart glasses 440 relay the received signal using various relay communication schemes or methods. For example, the smart glasses 440 may use the AF method, the QF method, or the CF method to relay the received signal. The smart glasses 440 may relay the received signal using a relay function, such as amplification and compression that does not demand dedicated decoding.

The second smart phone 430, already aware of the second signal, cancels a second signal component, which is self interference, from the transmitted signal to decode the first signal.

The second smart phone 430 receives the relay signal from the smart glasses 440 using the third resources while transmitting a second message simultaneously, thus supporting the virtual full duplex communication.

Figure 5:
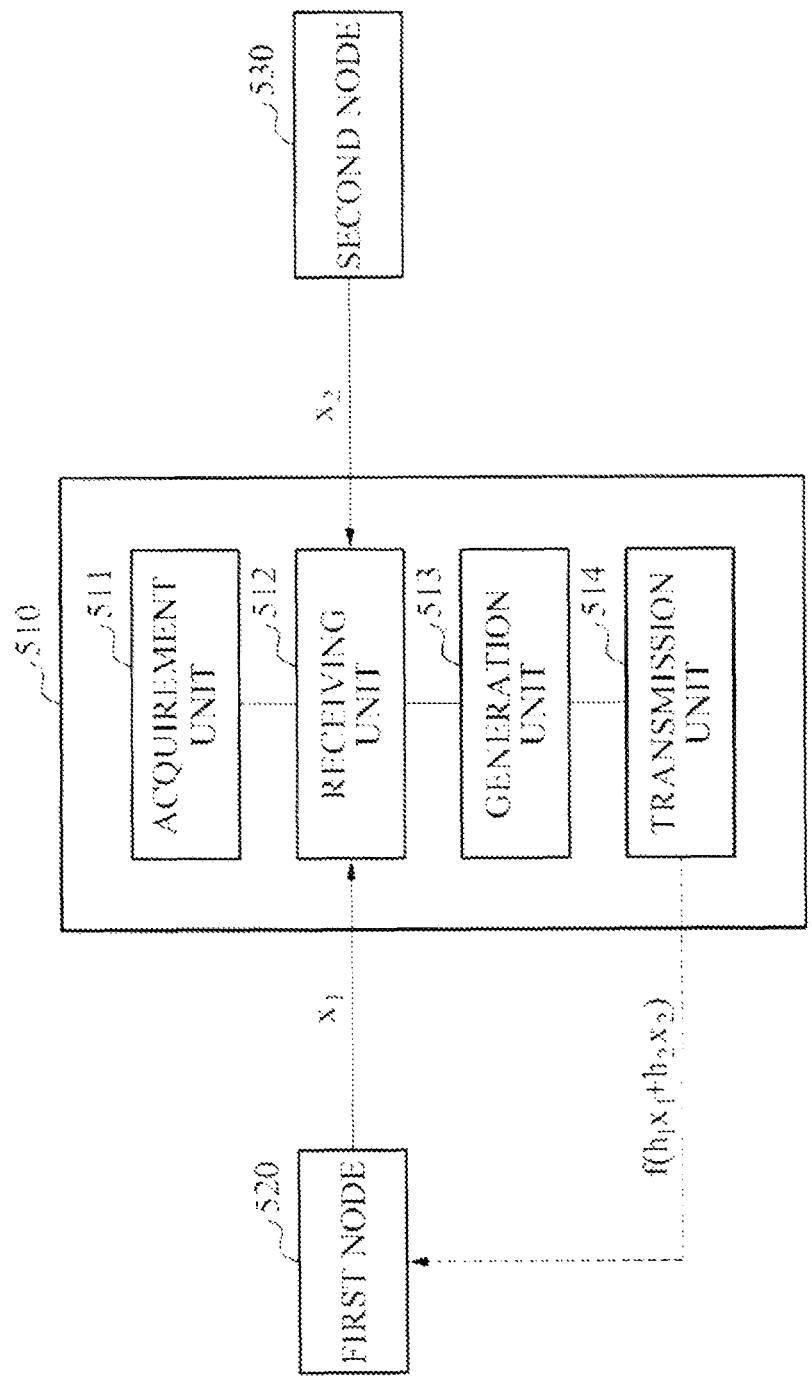
FIG. 5 is a block diagram illustrating an example of a relay device for virtual full duplex communication, in accord with an embodiment.

FIG. 5 illustrates an example of a relay device 510 for virtual full duplex communication, in accord with an embodiment.

Referring to FIG. 5, the relay device 510, according to the embodiment, receives a signal transmitted by a second node 530 and transmits the received signal to a first node 520. The relay device 510 is a device that uses unused resources of the first node and the second node, such as a laptop computer, a desktop computer, a tablet computer, a smart phone, a PDA, a nano relay, a terminal, and a D2D. Prior to performing relaying, the relay device 510 is operatively connected to the first node 520 in advance through a Wi-Fi initiation protocol, a Bluetooth initiation protocol, a ZigBee initiation protocol, a WPAN initiation protocol, and other similar protocols.

The relay device 510 includes an acquirement unit 511, a receiving unit 512, a generation unit 513, and a transmission unit 514.

The acquirement unit 511 acquires information on resources for receiving a radio signal. The acquirement unit 511 acquires the information on resources according to an operation mode.

For example, in a transparent mode in which the second node 530 may operate unaware of a presence of the relay device 510, the acquirement unit 511 acquires the information about resources to receive the radio signal. However, in a non-transparent mode in which the second node 530 operates aware of presence of the relay device 510, the acquirement unit 511 acquires the information about the resources to receive the radio signal from the second node 520.

The receiving unit 512 receives an overlapped signal of a first signal $x_1$ transmitted from the first node 520 and a second signal $x_2$ transmitted from the second node 530 using the resources acquired at the acquirement unit 511.

The generation unit 513 generates a relay signal based on the signal received at the receiving unit 512. The transmission unit 514 transmits the relay signal generated from the generation unit 513 to the first node 520.

Because the technical features of FIGS. 1 to 4 are applicable to the first node 520, the second node 530, and the relay device 510, a detailed description will be omitted.

Figure 6:
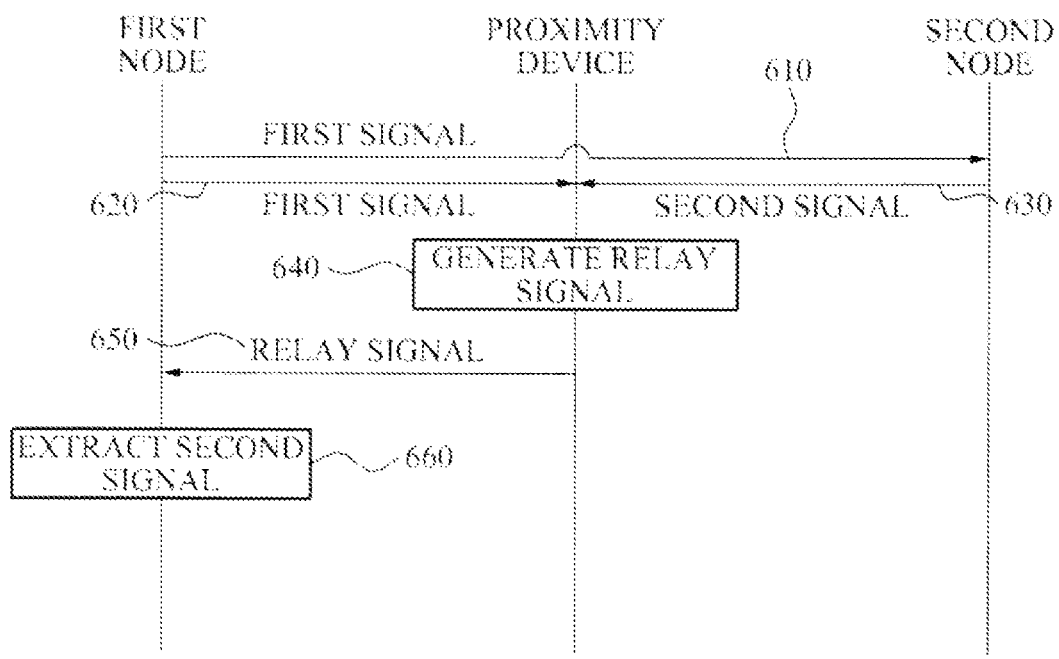
FIG. 6 is a flow chart illustrating an example of a virtual full duplex communication method, in accord with an embodiment.

FIG. 6 illustrates an example of a virtual full duplex communication scheme or method, in accord with an embodiment.

Referring to FIG. 6, a first node supports half duplex communication and a second node supports full duplex communication.

In operation 610, the method transmits from the first node a first signal to the second node. Simultaneously, the method directs the second node to transmit a second signal to the first node.

However, the first node supporting half duplex communication may not directly receive the second signal transmitted from the second node. In operation 630, the method directs a proximity device linked to the first node to receive the second signal on behalf of the first node. Simultaneously, in operation 620, the method directs the proximity device to receive the first signal transmitted by the first node.

In operation 640, the method directs the proximity device to generate a relay signal using an overlapped signal of the first signal and the second signal. In operation 650, the method directs the proximity device to transmit the relay signal to the first node. In operation 660, the method extracts the second signal at the first node from the relay signal.

Because technical features of FIGS. 1 to 5 are applicable to the foregoing operations of FIG. 6, a detailed description will be omitted.

It is to be understood that in one embodiment, the operations in FIG. 6 are performed in the sequence and manner as shown although the order of some steps and the like may be changed without departing from the spirit and scope of the embodiment.

The units and apparatuses described herein may be implemented using hardware components. The hardware components may include, for example, transmitters, receivers, extractors, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal comprising:
    a transmitter configured to use a first communication scheme to transmit an uplink signal to a base station;
    a receiver configured to use a second communication scheme to receive, from a proximity device, a relay signal, the relay signal comprising the transmitted uplink signal and a downlink signal, wherein the downlink signal comprises a signal transmitted from the base station and received by the proximity device; and
    a processor configured to obtain the downlink signal from the relay signal by canceling the uplink signal from the relay signal,
    wherein the uplink signal is transmitted on a same frequency and at a same time as the downlink signal, and
    wherein the transmitter is further configured to transmit a second uplink signal via the first communication scheme while the receiver is receiving the relay signal via the second communication scheme.

2. The terminal of claim 1, wherein the receiver is further configured to receive the relay signal from the proximity device through a short range wireless communication network set with respect to the proximity device.

3. The terminal of claim 1, wherein a first frequency resource and a first time resource used to transmit the uplink signal from the transmitter are same as a frequency resource and a time resource used to transmit the downlink signal from the base station, and
the second communication scheme uses different resources from one or both of the first frequency resource and the first time resource.

4. The terminal of claim 1, wherein
the transmitter transmits the uplink signal to the base station through the first communication scheme using first resources, and
the receiver receives the relay signal from the proximity device through the second communication scheme using second resources, wherein the second communication scheme uses a lower transmission power than a transmission power used by the first communication scheme.

5. The terminal of claim 1, wherein the processor is further configured to share information on a first frequency resource and a first time resource allocated by the base station for transmission of the downlink signal,
wherein the transmitter transmits the uplink signal using the first frequency resource and the first time resource, and the relay signal is based on an overlapped signal of the uplink signal and the downlink signal received using the first frequency resource and the first time resource.

6. The terminal of claim 1, wherein the processor is further configured to share information with the proximity device,
wherein the base station informs the proximity device of information allocated by the base station.

7. The terminal of claim 1, wherein the base station supports full duplex communication.

8. A terminal, comprising:
a processor configured to determine a first frequency resource and a first time resource used by a corresponding terminal to transmit a second signal;
a transmitter configured to transmit, using a first communication scheme, a first signal using the determined first frequency resource and first time resource; and
a receiver configured to receive, using a second communication scheme which is different from the first communication scheme, a relay signal comprising the first signal and the second signal,
wherein the processor is further configured to obtain the second signal from the relay signal by canceling the first signal from the relay signal, and
wherein the transmitter is further configured to transmit a third signal via the first communication scheme while the receiver is receiving the relay signal via the second communication scheme.

9. The terminal of claim 8, wherein the relay signal is based on an overlapped signal of the second signal from the corresponding terminal and the first signal from the transmitter.

10. The terminal of claim 8, wherein the receiver receives the second signal from the corresponding terminal through a proximity device.

11. The terminal of claim 8, wherein the corresponding terminal transmits the second signal using the first frequency resource and the first time resource, determined at the processor.

12. The terminal of claim 8, wherein
the second communication scheme uses different resources from one or both of the first frequency resource and the first time resource; and
the second communication scheme uses lower transmission power than transmission power used by the first communication scheme.

13. The terminal of claim 8, wherein the processor is further configured to share information about the first frequency resource and the first time resource,
wherein the relay signal is based on an overlapped signal of the first signal and the second signal using the first frequency resource and the first time resource.

14. The terminal of claim 10, wherein the processor is further configured to:
acquire information from a second proximity device linked to the corresponding terminal, and
share information about the first frequency resource and the first time resource with the second proximity device.

15. The terminal of claim 14, wherein the second proximity device, linked to the corresponding terminal, relays an overlapped signal of the second signal transmitted from the corresponding terminal and the first signal transmitted from the transmitter to the corresponding terminal.

16. A relay device comprising:
a receiver configured to receive an overlapped signal of a first signal transmitted from a first node, based on a first communication scheme using a first frequency resource and a first time resource and a second signal transmitted from a second node, based on the first communication scheme using the first frequency resource and the first time resource;
a processor configured to generate a relay signal based on the overlapped signal; and
a transmitter configured to transmit the relay signal, to the first node, based on a second communication scheme,
wherein the receiver is further configured to receive a second overlapped signal via the first communication scheme while the transmitter is transmitting the relay signal via the second communication scheme.

17. The relay device of claim 16, wherein the processor is further configured to acquire information on the first frequency resource and the first time resource.

18. The relay device of claim 16, wherein the second signal comprises a signal obtained from the relay signal based on the first signal.

19. The relay device of claim 16, wherein,
the transmitter transmits the relay signal based on the second communication scheme using different resources from one or both of the first frequency resource and the first time resource, and
the second communication scheme uses lower transmission power than transmission power used by the first communication scheme.

20. The relay device of claim 17, wherein the processor is further configured to acquire information of the first frequency resource and the first time resource from the second node if the second node is aware of a presence of the relay device, and acquires the information of the first frequency resource and the first time resource from the first node if the second node is unaware of presence of the relay device.

21. A method of a terminal, comprising:
transmitting, using a first communication scheme, an uplink signal to a base station;
receiving, from a proximity device using a second communication scheme, a relay signal, the relay signal comprising the uplink signal and a downlink signal, wherein the downlink signal comprises a signal transmitted from the base station and received by the proximity device;

transmitting a second uplink signal via the first communication scheme while receiving the relay signal via the second communication scheme; and obtaining the downlink signal from the relay signal by canceling the uplink signal from the relay signal, wherein the uplink signal is transmitted on a same frequency and at a same time as the downlink signal.

22. The method of claim 21, further comprising:

configuring the relay signal to be a sum of the uplink signal times a state of a channel between the base station and the proximity device, and the downlink signal times a state of a channel between the proximity device and the terminal.

23. The method of claim 21, further comprising:

receiving the relay signal from the proximity device through a short range wireless communication network set with respect to the proximity device.

24. The method of claim 21, further comprising:

configuring a first frequency resource and a first time resource to transmit the uplink signal from the transmitter to be the same as a frequency resource and a time resource used to transmit the downlink signal from the base station.

25. The method of claim 21, further comprising:

transmitting the uplink signal to the base station through the first communication scheme using a first frequency resource and a first time resource; and receiving the relay signal from the proximity device through the second communication scheme using resources that are different from one or both of the first frequency resource and the first time resource, wherein the second communication scheme uses a lower transmission power than a transmission power used by the first communication scheme.

26. The method of claim 21, further comprising:

sharing information on a first frequency resource and a first time resource allocated by the base station; and transmitting the uplink signal using the first frequency resource and the first time resource, wherein the relay signal is based on an overlapped signal of the uplink signal and the downlink signal using the first frequency resource and the first time resource.

27. The method of claim 21, further comprising:

sharing information with the proximity device, wherein the base station informs the proximity device of information allocated by the base station.

28. A non-transitory computer readable medium storing instructions that, when executed by a processor, cause the processor to perform the method of claim 21.

* * * * *